United States Patent [19]

Knapp

[11] Patent Number: 4,623,000

[45] Date of Patent: Nov. 18, 1986

[54] MOVABLE PLAQUE FOR THE FLOW CONTROL DEVICE OF A SINGLE CONTROL MIXER VALVE

[75] Inventor: Alfons Knapp, Biberach an der Riss, Fed. Rep. of Germany

[73] Assignee: Gevipi A.G., Vaduz, Liechtenstein

[21] Appl. No.: 725,135

[22] Filed: Apr. 18, 1985

[30] Foreign Application Priority Data

May 23, 1984 [IT] Italy .............................. 67518 A/84

[51] Int. Cl.⁴ ............................................. F16K 11/06
[52] U.S. Cl. .............................. 137/625.17; 137/625.4
[58] Field of Search ............ 137/625.17, 625.4, 625.41

[56] References Cited

U.S. PATENT DOCUMENTS

| | | | |
|---|---|---|---|
| 2,020,286 | 11/1935 | Bittle | 137/625.4 |
| 2,977,986 | 4/1961 | Hinderer et al. | 137/625.4 |
| 3,023,784 | 3/1962 | Monson | 137/625.17 |
| 3,384,119 | 5/1968 | Manoogian | 137/625.17 |
| 3,533,444 | 10/1970 | Lyon | 137/625.17 |
| 3,543,799 | 12/1970 | Hayman | 137/625.17 |
| 3,765,455 | 10/1973 | Countryman | 137/625.4 |

FOREIGN PATENT DOCUMENTS 3309339 9/1984 Fed. Rep. of Germany ... 137/625.4

Primary Examiner—Alan Cohan
Assistant Examiner—John A. Rivell
Attorney, Agent, or Firm—Young & Thompson

[57] ABSTRACT

An imperforate movable hard material plaque, intended to be displaced both diametrically and rotationally with respect to a fixed plaque having two passage openings for hot and cold water, respectively, in the flow control device of a single control mixer valve, whose shape substantially comprises a basic circle at least half of which forms the outline of the movable plaque, and at least one substantially triangular portion which protrudes towards the outside from the basic circle and whose two outer sides are both substantially tangent to the basic circle. In a preferred embodiment two such substantially triangular portions are provided, and a side of one of these portions substantially constitutes the continuation of a side of the other portion. Preferably, the sides defining the triangular portions are formed by circle arcs or by straight line segments. In a preferred embodiment, the outline of the plaque is substantially defined by a semicircle continued by two straight line segments connected to one another by a circle arc whose radius is considerably larger than the radius of said semicircle, and the maximum length of the plaque, measured between the semicircle and the circle arc, is almost equal to twice the radius of the semicircle.

7 Claims, 9 Drawing Figures

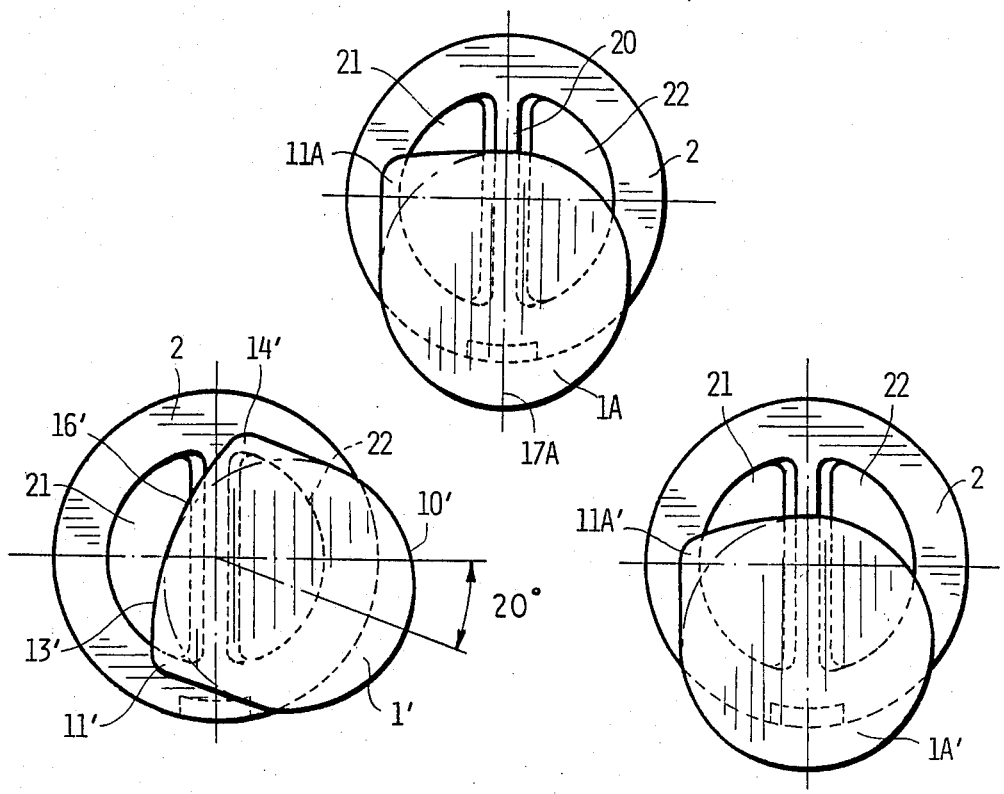
FIG. 7
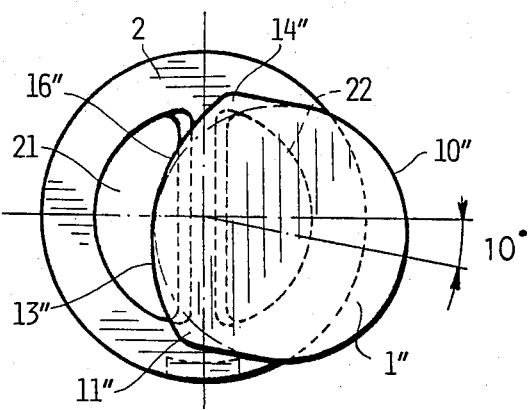
FIG. 5
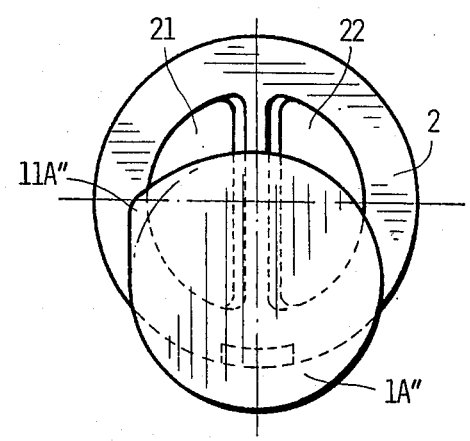
FIG. 8
FIG. 6
FIG. 9

MOVABLE PLAQUE FOR THE FLOW CONTROL DEVICE OF A SINGLE CONTROL MIXER VALVE

BACKGROUND OF THE INVENTION

The present invention relates to a movable hard material plaque intended to cooperate with a fixed plaque in the flow control device of a single control mixer valve.

From the U.S. patent application Ser. No. 513,109 of the same Inventor is known a flow control device for a single control mixer valve, comprising: a structure, a fixed hard material plaque, operatively fixed in said structure, having an upper plane surface and provided with at least two openings for the passage of hot and cold water respectively; a movable hard material plaque, having a lower plane surface disposed in sliding contact with said upper plane surface of the fixed plaque in order to regulate the flow of the hot and the cold water respectively; a control head rigidly connected to said movable plaque and having a coupling means for an operating lever; and a guide member mounted in said structure, rotating for a limited angle about an axis perpendicular to said plane contact surfaces of said fixed and movable plaques, and having guide means cooperating with said control head in order to allow said control head to move, relative to said guide member, only along a diametrical direction thereof; the openings of said fixed plaque being contained within a circle having its center at the intersection between said upper plane surface of the fixed plaque and the extension of the rotation axis of said guide member; and in which said movable plaque has its lower plane surface free from openings and recesses, cooperates with said openings of the fixed plaque exclusively by means of at least a portion of its outline, and said portion of the outline of the movable plaque, intended to cooperate with the openings of the fixed plaque, has a basic configuration free from concave curves and from concave angles, and is situated entirely outside a circle having a radius not smaller than the radius of said circle which contains the openings of the fixed plaque, and having its center at that point of the lower plane surface of the movable plaque which, in the position of total closure, is intersected by the extension of the rotation axis of said guide member.

Thanks to such a control device, the design of the mixer valve is made free from the usual limitations which are imposed to the rotation angle of the operating lever of the mixer valve, and it is possible to attain rotation angles very near the theoretical limit of 180°, while the regulation may be carried out on a smaller angle, if preferred, by adopting a suitable configuration of the fixed plaque openings.

However, in certain cases it would be desirable to have the possibility of carrying out the regulation on an angle considerably lower than the limit of 180°, although being larger than the usually permitted angle, without having to modify the configuration of the fixed plaque with respect to that which allows obtaining the maximum amplitude of the range of regulation.

BRIEF SUMMARY OF THE INVENTION

The object of the present invention is to provide a movable plaque for a flow control device of the type referred to, which will be capable of carrying out the regulation within a range to a pre-established extent smaller than the limit of 180°, without requiring any modification of the basical configuration of the fixed plaque, capable of allowing the wider amplitudes of the range of regulation.

This objet is attained, according to the present invention, by the fact that the movable plaque has a shape substantially resulting from a basic circle from which at least one substantially triangular portion, whose sides are substantially tangent to said basic circle, protrudes towards the outside.

In many cases it is preferable that said substantially triangular portions are two in number, and that a side of one of said portions substantially forms the continuation of a side of the other portion.

Preferably, the sides defining said triangular portions may be formed by arcs of circles or by segments of straight lines.

Thanks to these characteristics, each triangular portion projecting from the circular basic configuration keeps occluded one of the passage openings of the fixed plaque by a pre-established angle of rotation of the movable plaque, thus correspondingly limiting the angle of operation, even if the openings of the fixed plaque maintain their maximum amplitude. In the cases in which the triangular portions are two in number, this limitation is substantially symmetrical as regards the regulation of the hot water flow and the regulation of the cold water flow whilst, when only one triangular portion is provided, there is an asymmetry as regards the two flows of water, which asymmetry may in certain cases be advantageous.

BRIEF DESCRIPTION OF THE DRAWINGS

These and other characteristics and the advantages of the subject of the present invention will be more clearly apparent from the following description of some embodiments, described by way of non limiting examples and diagrammatically shown in the annexed drawings, in which:

FIGS. 5 and 6 show two modifications to said first embodiment;

FIG. 7 shows a second embodiment of a movable plaque according to the invention; and FIGS. 8 and 9 show two modifications to said second embodiment.

DETAILED DESCRIPTION OF THE PREFERRED EMBODIMENTS

Figure 1:
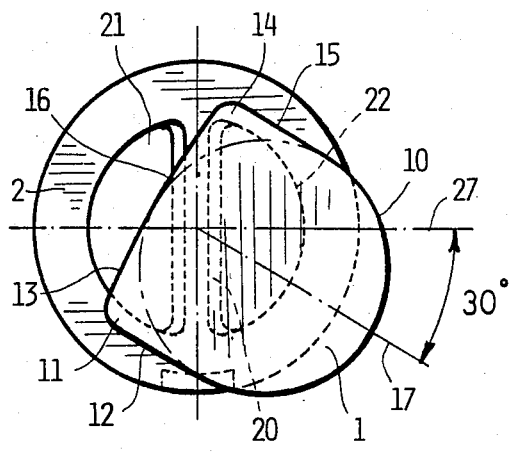
FIGS. 1 to 4 show a first embodiment of a movable plaque according to the invention, in its cooperation with a fixed plaque adapted to allow an ample range of regulation, in four characteristic operative positions.

Referring firstly to FIGS. 1 to 4, the movable plaque 1 according to the first embodiment of the invention has a basic configuration formed by a circle 10, which for about one half of its extension defines the actual outline of the plaque 1, while its other half is virtual and is indicated by dot-and-dash lines. The outline of the plaque 1 deviates from the configuration of this circle 10 because of the protrusion of two substantially triangular portions 11 and 14. Portion 11 is delimited by a straight line segment 12 and by a circle arc 13, and portion 14 is delimited by a straight line segment 15 and by a circle arc 16; arcs 13 and 16 belong to the same circle whose center is situated on a symmetry axis 17 of the plaque 1, and whose radius, in this example, is approximately five times larger than the radius of circle 10.

Figure 2:
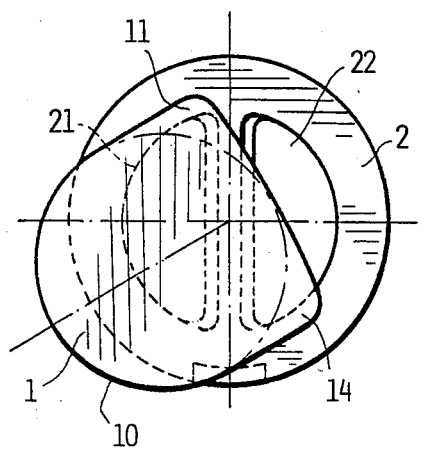

Plaque 1 is shown in its position of coopeation with a fixed plaque 2 capable of allowing an ample range of regulation, substantially of the type described in the referred U.S. patent application Ser. No. 513,109, and having two passage openings 21 and 22 for the hot and the cold water respectively, in the form of opposite one-base segments of circle, separated from one another by a bridge 20. In FIG. 1 the plaque 1 is shown in the position in which it uncovers the opening 21 of the fixed plaque and thus allows the delivery of cold water, while it completely occludes the opening 22 and consequently it intercepts the delivery of hot water. With the proportions adopted by way of example, this condition arises when the axis of symmetry 17 of the movable plaque 1 forms an angle of 30° with the axis of symmetry 27, perpendicular to the bridge 20, of the fixed plaque 2. FIG. 2 shows the condition symmetrical to that of FIG. 1, in which the movable plaque 1 uncovers the opening 22 of the fixed plaque, and thus allows the delivery of hot water, while it completely occludes the opening 21 and consequently it intercepts the delivery of cold water. Thus, in this case the range of regulation results in being 180°−2×30°=120°.

As it can be remarked, the limitation of the range of regulation is due, in the condition shown in FIG. 1, to the presence of portion 14, and in the condition shown in FIG. 2 it is due to the presence of portion II, and therefore it actually results from the configuration given by the present invention to the movable plaque 1.

Figure 3:
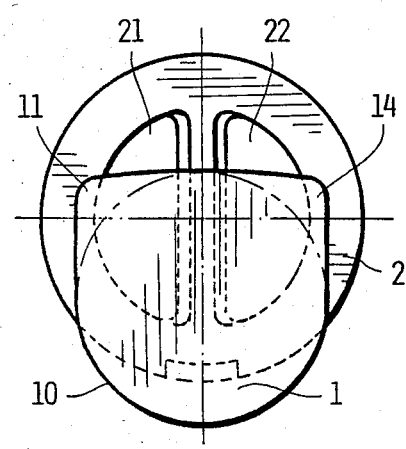
Figure 4:
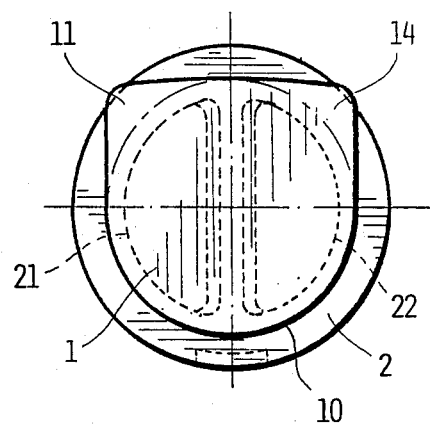

FIG. 3 shows a position, intermediate between those shown in FIGS. 1 and 3, in which the movable plaque 1 uncovers in equal proportions the openings 21 and 22 of the fixed plaque 2, thus allowing the delivery of mixed water formed by equal parts of cold and hot water. Finally, FIG. 4 shows the condition of complete closure performed by the movable plaque 1 on the fixed plaque 2.

The angle of the obtained range of regulation depends, among other things, on the ratio between the radius of the arc 13–16 and the radius of the circle 10. In the modified embodiment shown in FIG. 5, the ratio between said two radiuses is of about 2.5, and the angle between the axes of symmetry 17 and 27, which in FIG. 1 was of 30°, assumes now the value of 20°. Therefore, in this case the range of regulation results in being of 180°−2×20°=140°. Finally, in the modified embodiment shown in FIG. 6, the ratio between said two radiuses is of about 1.5, and the angle between the axes of symmetry 17 and 27, which in FIG. 1 was of 30°, assumes now the value of 10°. Accordingly, in this case the range of regulation is of 180°−2×10°=160°. Therefore, a judicious choice of the ratio between the radiuses of the arc 13–16 and the circle 10 allows obtaining, with the plaque according to the invention, the desired amplitude for the range of regulation.

When the plaque has one of the described configurations, which are preferred although not binding, its outline is defined substantially by a semicircle continued by two segments of straight line connected to one another by an arc of circle whose radius is considerably larger than the radius of said semicircle, and the maximum length of the plaque, measured between said semicircle and said arc of circle, is approximately twice the radius of said semicircle.

A particular advantage offered by the plaque according to the invention, when it is configured as described hereinabove, consists in that the delivery of the water takes place essentially in a position corresponding to the consecutive sides 13–16 of the triangular portions 11, 14. This facilitates in a particular manner the provision, in this limited zone of the valve in which the plaque is mounted, of means intended to dampen the flow and to reduce the noise and the vibrations.

Another advantage of the plaque according to the invention consists in that the triangular portions 11 and 14 always rest on the rim of the fixed plaque 2 and provide a sure rest for this latter thus preventing a lifting thereof, which otherwise could be produced by the resilient thrust of the underlying sealing gaskets, when the movable plaque is displaced to a very eccentric position.

In the second embodiment of the invention, shown in FIG. 7, the movable plaque IA has, with respect to the circular basic shape, a single projecting portion 11A, substantially triangular, disposed asymmetrically relative to the movable plaque axis 17A, which registers with the bridge 20 of the fixed plaque 2 when the movable plaque 1A is shifted relative to the fixed plaque 2 along the direction of said bridge 20. In this case, as it can be immediately understood when observing FIG. 7, the behaviour of the movable plaque 11A is not symmetrical relative to the cold water inlet opening 21 and the hot water inlet opening 22, in the sense that a displacement of the movable plaque 1A, consisting in a rotation of the axis 17A, modifies the uncovered surface of the opening 21 to a much higher extent as compared to the modification of the uncovered surface of the opening 22. Thus, under these conditions, the regulation of the mixing is obtained substantially by adding a variable flow of cold water to an almost constant flow of hot water. This asymmetrical behaviour is advantageous, for example, in those case in which the mixer valve is fed by a gas operated instantaneous water heater. Such apparatuses operate correctly only within a limited range of flow rates, and thanks to the described arrangement it becomes possible to limit the variation of flow rate affecting the heater, with respect to ample temperature variations of the delivered mixed water. It is thus possible to obtain an ample range of regulation of the temperature without jeopardizing the correct operation of the heater.

The degree of asymmetry in the behaviour of the movable plaque 1A in respect of the hot and cold water may be graduated by suitably configurating the single triangular portion 11A projecting from the basic circular configuration of the plaque 1A. In this case too, the lines which delimit the triangular portion may be segments of straight lines or arcs of circles of various radiuses, and FIGS. 8 and 9 show, as examples, two movable plaque configurations modified with respect to the configuration shown in FIG. 7.

Although having dealt in the foregoing with a basic circular configuration, substantially triangular protruding portions and outlines formed by straight line segments and/or circle arcs, it is to be understood that these geometrical definitions have an indicative character, and that the configurations actually adopted may in any case be approximate with respect to these definitions. Also approximately complied with may be the condition according to which the sides of the triangular portion are substantially tangent to the basic circle. Moreover, the preferred condition according to which, when said portions are two in number, one side of one of said portions substantially constitutes the continuation of one side of the other portion, may in certain cases not be observed, and an angle or a radius may be present between said two consecutive sides.

I claim:

1. An imperforate movable hard material plaque slidably supported for both diametrical and rotational displacements with respect to a fixed circular plaque having two passage openings in the flow control device of a single control mixer valve so as to selectively open and close said passage openings, whose shape substantially comprises a basic circle at least half of which forms the outline of the movable plaque, and at least one substantially triangular portion which protrudes towards the outside from said basic circle and whose two outer sides are both substantially tangent to said basic circle.

2. A plaque as set forth in claim 1, wherein said triangular portion is only one.

3. A plaque as set forth in claim 1, wherein said substantially triangular portions are two in number.

4. A plaque as set forth in claim 3, wherein one of said substantially triangular portions has a side which substantially constitutes the continuation of a side of the other substantially triangular portion.

5. A plaque as set forth in claim 1, wherein said substantially triangular portions have sides formed by arcs of circles and/or by segments of straight lines.

6. A plaque as set forth in claim 1, whose outline is substantially defined by a semicircle continued by two straight line segments connected to one another by an arc of a circle whose radius is considerably greater than the radius of said semicircle.

7. A plaque as set forth in claim 6, wherein the maximum length of the movable plaque, measured between said semicircle and said arc of a circle, is almost twice the radius of said semicircle.

* * * * *